July 29, 1941.  R. C. SCHOCK  2,250,777
MEANS FOR AERATING AND COOLING WORT
Filed March 25, 1940
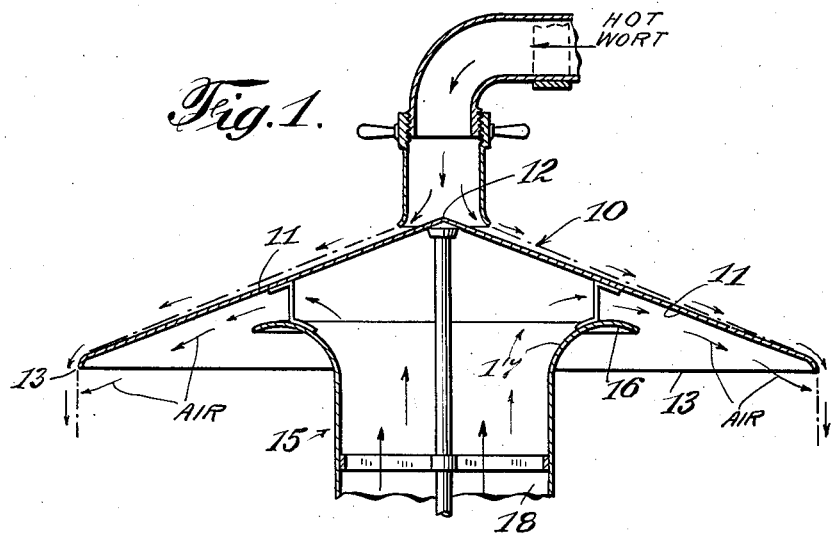
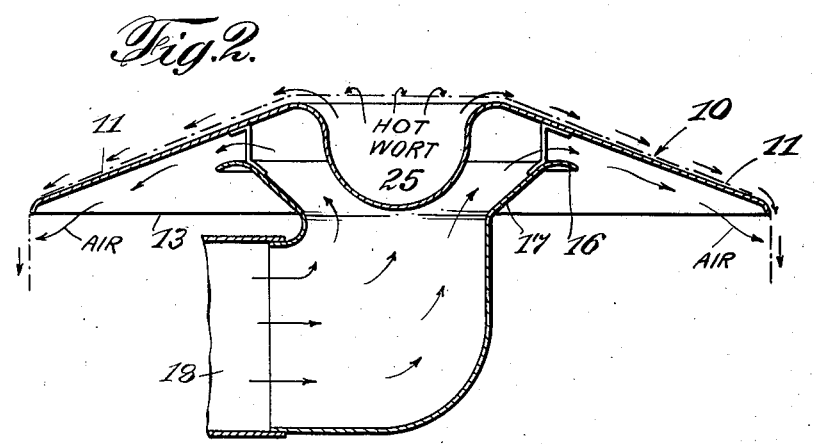
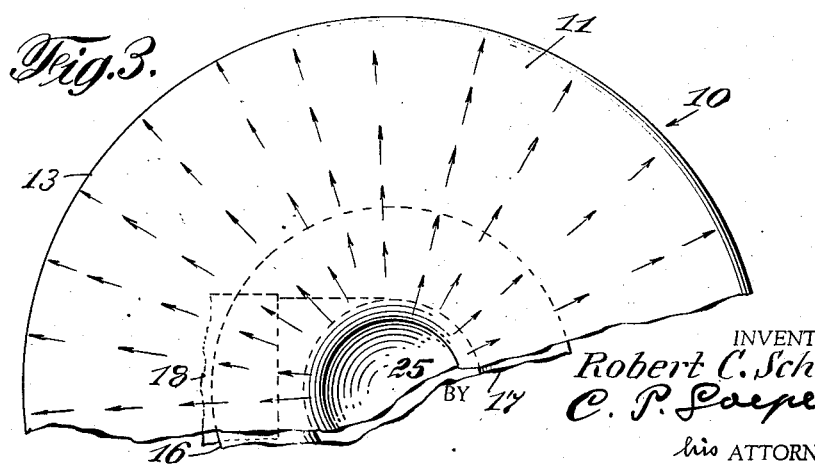
INVENTOR.
Robert C. Schock
C. P. Soepel
BY
his ATTORNEY.

Patented July 29, 1941

2,250,777

UNITED STATES PATENT OFFICE 2,250,777

MEANS FOR AERATING AND COOLING WORT

Robert C. Schock, New Rochelle, N. Y., assignor to Schock, Gusmer & Co. Inc., Hoboken, N. J., a corporation of New Jersey Application March 25, 1940, Serial No. 325,807

1 Claim. (Cl. 261—9)

This invention relates to wort aerating and cooling means.

The object of the invention is to clarify and improve the condition of the wort during its cooling.

The invention consists in subjecting the wort to an attenuated form and while in this form subjecting the wort to the action of air.

The apparatus consists of an umbrella like wort distributor which receives its wort at the central part thereof, and as this wort moves radially outwards upon increasing circumferential areas the wort becomes thinner and thinner while yet adhering, and in this adhering, but thinned condition, is subjected to the action of attenuating flow of air which decreases in density radially and circumferentially outwardly. The wort could form a peripheral sheath or form into drops, as it descends and in descending encounters the cooling air.

The invention will be further described, embodiments thereof shown in the drawing, and the invention will be pointed out in the drawing.

In the accompanying drawing—

Figure 1 is a central sectional view of the improved apparatus, showing one embodiment thereof;

Figure 2 is a similar sectional view of another embodiment; and

Figure 3 is a detail view showing the wort being acted upon by the air.

Similar characters of reference indicate corresponding parts throughout the various views.

Referring to the drawing, the apparatus consists essentially of an umbrella like distributor 10 which is generally cone shaped, that is with inclined walls 11, descending from the apex 12 to the periphery 13. As in conical structures, the circumference increases radially, so that a given quantity of fluid having a certain coverage to cover such a surface will terminate at the peripheral parts of said conical structure, and form drops or the like at the perimeter, instead of a continuous sheet. In such cases where a sheet formation is desired, the quantity is increased so as to increase the coverage accordingly.

Below the conical member 10 or umbrella, is an air shaping member 15. This consists essentially of a flaring perimeter 16 which has the largest diameter and circumference. The walls 17 converge to a central receiving end 18. The air entering the receiving end 18 and emanating from the perimeter 16, travels still further radially and circumferentially, thus attenuating until it strikes or encounters the drops or sheet of wort descending from the perimeter of the member 10.

Whether the air diffuses from the center outwardly or is forced outwardly, the air, when it reaches the perimeter of the member 10 is free to readily contact with the descending wort and to commingle therewith and to surround the same if the wort descends in a cylindrical sheet the air follows the interior bore of the cylinder without breaking through, depending on the relative thickness of layer or film of the descending sheet, its density, cohesive force, etc., and the intensity of airflow. The preferable method is for the air to break through as a better aerating is obtained.

While in the embodiment of Figure 1, the wort is continuously supplied centrally and is then distributed, in the embodiment of Figure 2, a central chamber or coolship 25 is provided and this is supplied by wort and the coolship 25 overruns and flows along and spreads over the umbrella shaped member to the perimeter thereof.

In each case, as the wort flows radially outwardly toward the perimeter, the mass re-shapes itself to a thin film or to droplets which, encountered by this airflow, is cooled thereby as seen in Figures 1 and 2.

The hot wort distributing hood or umbrella gives an even distribution of the hot wort over natural cooling and aerating unit leaving the same in a film about as thick as a sheet of paper. Natural air will be drawn through the wort film due to the vapor draft pipe. Forced air may be used. The diameter of the hood is figured by the capacity of the receiving tank and varies from six feet to ten feet in diameter.

For forced air aeration, this can be controlled automatically to suit various methods. For instance, sterile air can be used for aerating purposes summer and winter, thus climatical conditions will not affect the wort before cooling and gives a uniform product at all times, which in turn clarifies the wort, allows the formation of undesirable trub or scum to remain in receiving tank or coolship and not be carried in liquid form to the cooler and then to fermenters.

The air conditioning unit can also be used in connection with the distributing hood during hot weather as a natural filter or cooling aerating medium, while in cold weather the air can be filtered and preheated to prevent undesirable proportional evaporation.

The feeding pipe discharge end is perforated to eliminate forced feed which may cause splashing and uneven distribution over the hood. The small hood above the large one on feeding pipe is to prevent splashing at end of pumping period into the open wort coolship, especially when steam is used as vertical pipe emptier and sterilizer. In closed tanks this upper hood is not necessary.

The lowest point of the center hood reservoir may be provided with a small discharge pipe to drain the reservoir.

It is to be noted that all corners of the hood are round in order that the air has an equal unrestricted flow.

In connection with these units, the discharge of the tank may be provided with a float arrangement so the wort will at all times be drawn from the top, which is the coolest and clearest wort, and thus of benefit to the cooler which follows this brewing cycle. At the same time it allows the trub or sediment a longer period to settle without being distributed.

I have described several embodiments of my invention, but it will be clear that changes will be made within the principle of the invention described without departing from the scope of the subjoining claim.

What is claimed is:

In a wort aerating and cooling apparatus having a hot wort supply, the combination of a distribution hood of general conical shape with upper and lower conical surfaces substantially parallel and spaced from each other for receiving on its central upper surface hot wort from said hot wort supply and allowing it to descend and spread radially and circumferentially outwards on its upper surface from its central part and over the perimeter of the hood in a thin evenly distributed layer to form a film of wort gravitatingly descending over the outer surface of the hood and from the perimeter thereof to form a descending wort apron, and a conduit for filtered and conditioned air disposed below the central part of said hood and terminating in spaced relationship to the central part of the hood for discharging filtered and conditioned air against the under surface of the central part of the hood, said conduit having flaring ends curved to direct the filtered and conditioned air along the conical under surface of the hood radially and circumferentially outwards from the central portion to the perimeter of the hood to there contact with the descending wort apron, whereby said wort is subjected to radiation, conduction and convection of heat as it passes over and from the distribution hood.

ROBERT C. SCHOCK.